July 19, 1960     A. J. SOWER ET AL     2,945,517

PLURAL PANEL STRIP-CUTTING MACHINE WITH TRAVELING SAW

Filed Dec. 6, 1956     7 Sheets-Sheet 1

INVENTORS
ALBERT J. SOWER
SAMUEL J. KENT
BY
ATTORNEY

July 19, 1960 A. J. SOWER ET AL 2,945,517
PLURAL PANEL STRIP-CUTTING MACHINE WITH TRAVELING SAW
Filed Dec. 6, 1956 7 Sheets-Sheet 6

INVENTORS
ALBERT J. SOWER
SAMUEL J. KENT
BY
C. P. Stratton
ATTORNEY

July 19, 1960 A. J. SOWER ET AL 2,945,517
PLURAL PANEL STRIP-CUTTING MACHINE WITH TRAVELING SAW
Filed Dec. 6, 1956 7 Sheets-Sheet 7

INVENTORS
ALBERT J. SOWER
SAMUEL J. KENT
BY
C. H. Stratton
ATTORNEY

United States Patent Office 2,945,517
Patented July 19, 1960

2,945,517

PLURAL PANEL STRIP-CUTTING MACHINE WITH TRAVELING SAW

Albert J. Sower, North Hollywood, Calif. (1021 Isabel Ave., Burbank, Calif.), and Samuel J. Kent, 6432 Sunnyslope Ave., Van Nuys, Calif.

Filed Dec. 6, 1956, Ser. No. 626,735

5 Claims. (Cl. 143—47)

This invention relates to a machine for cutting strips from plywood and comparable panels, the same being used as carpet-anchoring strips after having been provided with barbs or the like on which carpet edges are caught to be held taut and anchored.

An object of the present invention is to provide a novel machine of the character referred to that is particularly characterized by high production at low cost.

Another object of the invention is to provide a strip-cutting machine in which strips are cut from a plurality of panels simultaneously by a single rotary cutter, the mentioned high production and low cost resulting from such simultaneous cutting and from the fact that the machine provides means for such a cut with each stroke of the cutter, thereby obviating time-wasting recovery strokes.

A further object of the invention is to provide a machine of the character referred to in which firm control of the panels is retained during all phases of the operation to, thereby, obviate accidental displacement of residual portions of the panels as may result from ineffective clamping or gripping of the panels while strips are being cut.

A still further object of the invention is to provide a novel method for cutting strips simultaneously from a plurality of stacked panels while retaining effective clamping of said stack regardless how small or narrow some of the residual portions of the panels may be.

A still further object of the invention is to provide a machine and method of the character referred to in which the rotary cutter used is bodily turned at opposite ends of the cutting strokes thereof and the direction of rotation maintained to effect strip-cutting during each stroke or traverse of the cutter.

A yet further object of the invention is to provide a machine and method, as above, in which a cutter is used that cuts equally effectively regardless of the direction of rotation thereof, and said direction being reversed only at the end of each stroke or traverse of the cutter.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

The strip-cutting machine that is illustrated in Figs. 1 to 8 comprises, generally, a frame 10, a trackway or guide 11, extending longitudinal of said frame, a strip-cutting unit 12 movable along said trackway, means 13 (Figs. 2 and 5) for holding a stack of panels in position to have strips cut therefrom by the unit 12 during its movement between the ends of the machine, means 14, controlled by the unit 12 at each end position thereof, to advance the means 13 and the stack of panels held thereby, and means 15 to move the unit 12 as above indicated and for reversing the same at the end of each stroke thereof preparatory to return movement.

Figure 2:
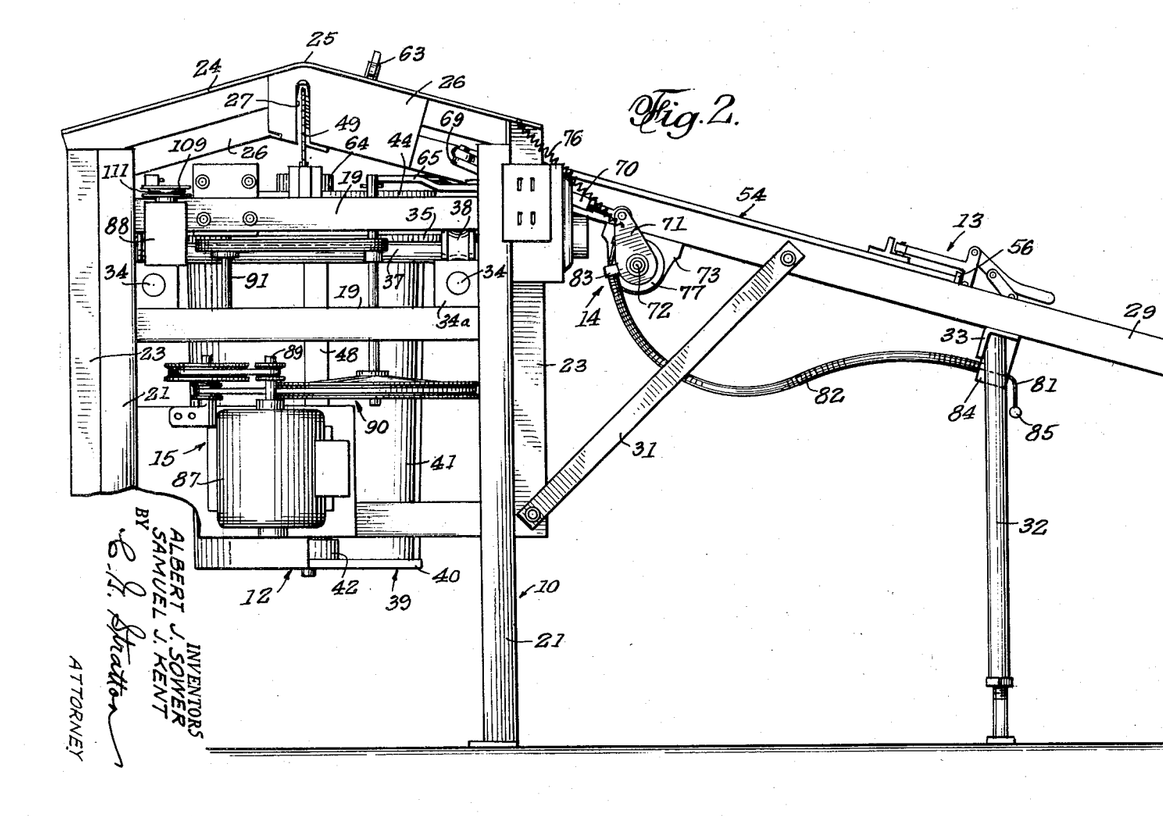
Fig. 2 is an enlarged end view, with covers and guards removed, as seen from the left end of Fig. 1.
Figure 5:
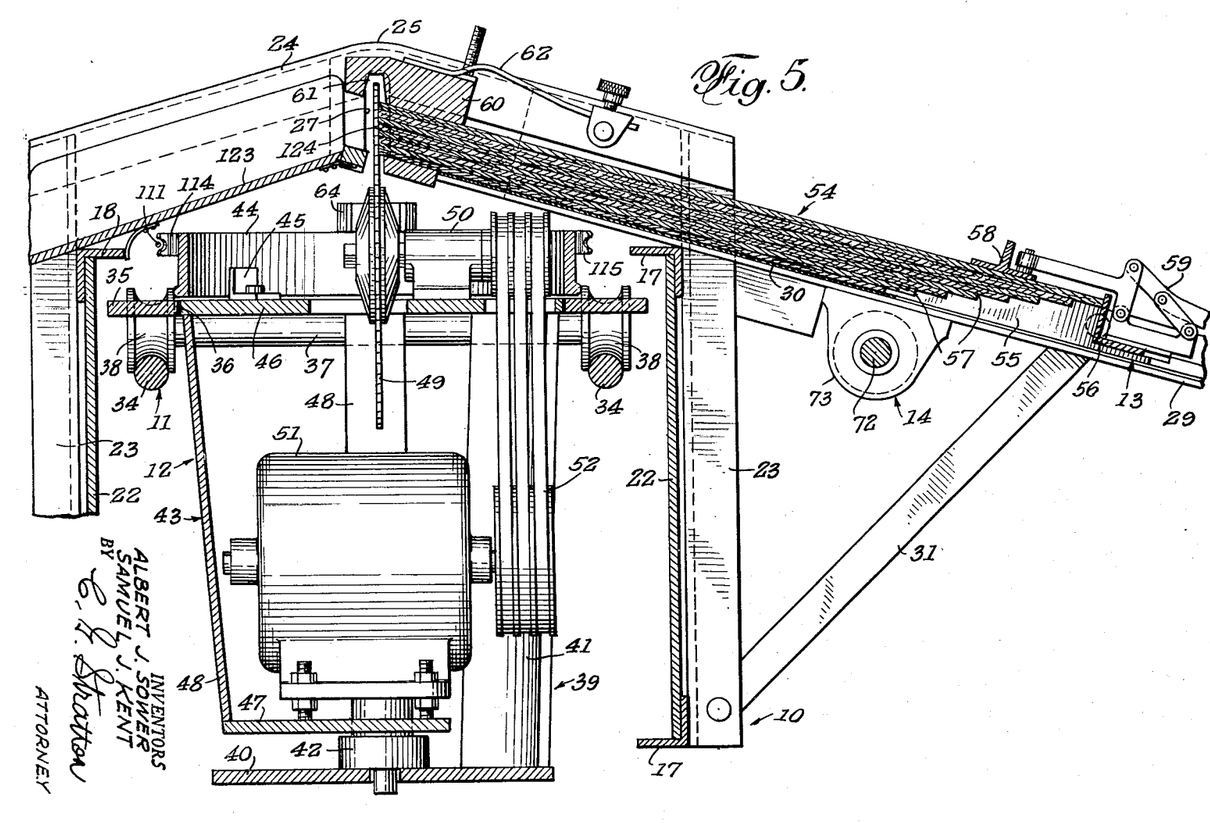
Fig. 5 is a cross-sectional view as taken on the plane of line 5—5 of Fig. 1, the same being enlarged to the size of Fig. 4 and the mechanism being shown in an intermediate or cutting position.

The present frame 10 is generally T-shaped, the cross bar portion of the same being horizontal and the leg portion preferably sloping downward from the cross bar portion, as best seen in Figs. 2 and 5. A frame part 16 of generally parallelepiped form comprises the cross bar portion, the same being formed of front horizontal and longitudinal frame members 17 (Fig. 3), similar rear members 18, left and horizontal frame members 19, similar right end members 20 (Fig. 6), and a set of corner leg members 21. Suitable panels 22 (Fig. 5) may enclose the frame part 16 thus provided at the sides and ends.

Where the cross bar and leg portions join, the frame 10 is provided with vertical frame members 23, front and back, the same being connected by members 24 that are disposed above the longitudinal frame members 17 and 18. In this case, said members 24 are bent, as seen in Figs. 2 and 5, to define a peak or apex 25 from which the opposite portions slope oppositely downward to where they join the members 23.

Said members 24 may be reinforced by plates 26 and a kerf or recess 27 may be provided therein, the same being disposed centrally between the members 17 and 18 and opening downward as shown.

Figures 4, 8:
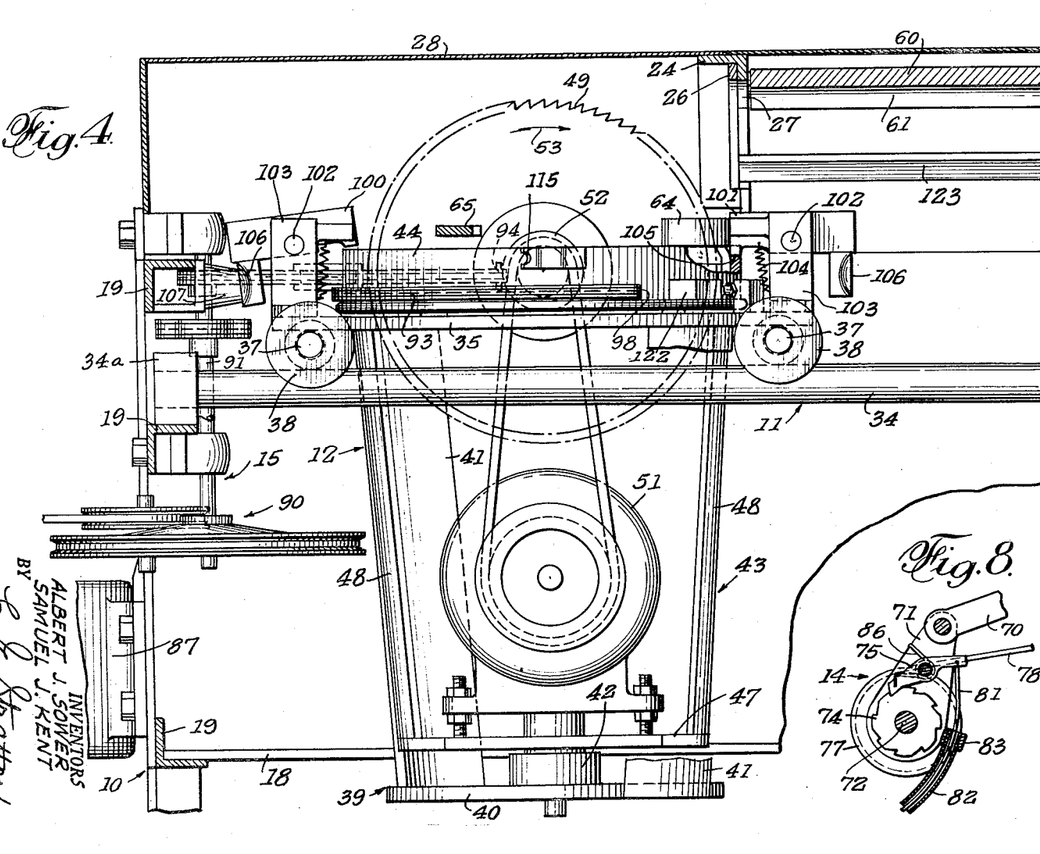
Fig. 4 is a vertical sectional view as taken on the line 4—4 of Fig. 3.
Fig. 8 (Sheet 4) is an enlarged sectional view as taken on the line 8—8 of Fig. 7.

The frame parts between members 24 and the end members 19 and 20 on each side, are preferably provided with covers 28, the same as shown in Fig. 4, enclosing the unit 12 from above.

Figure 1:
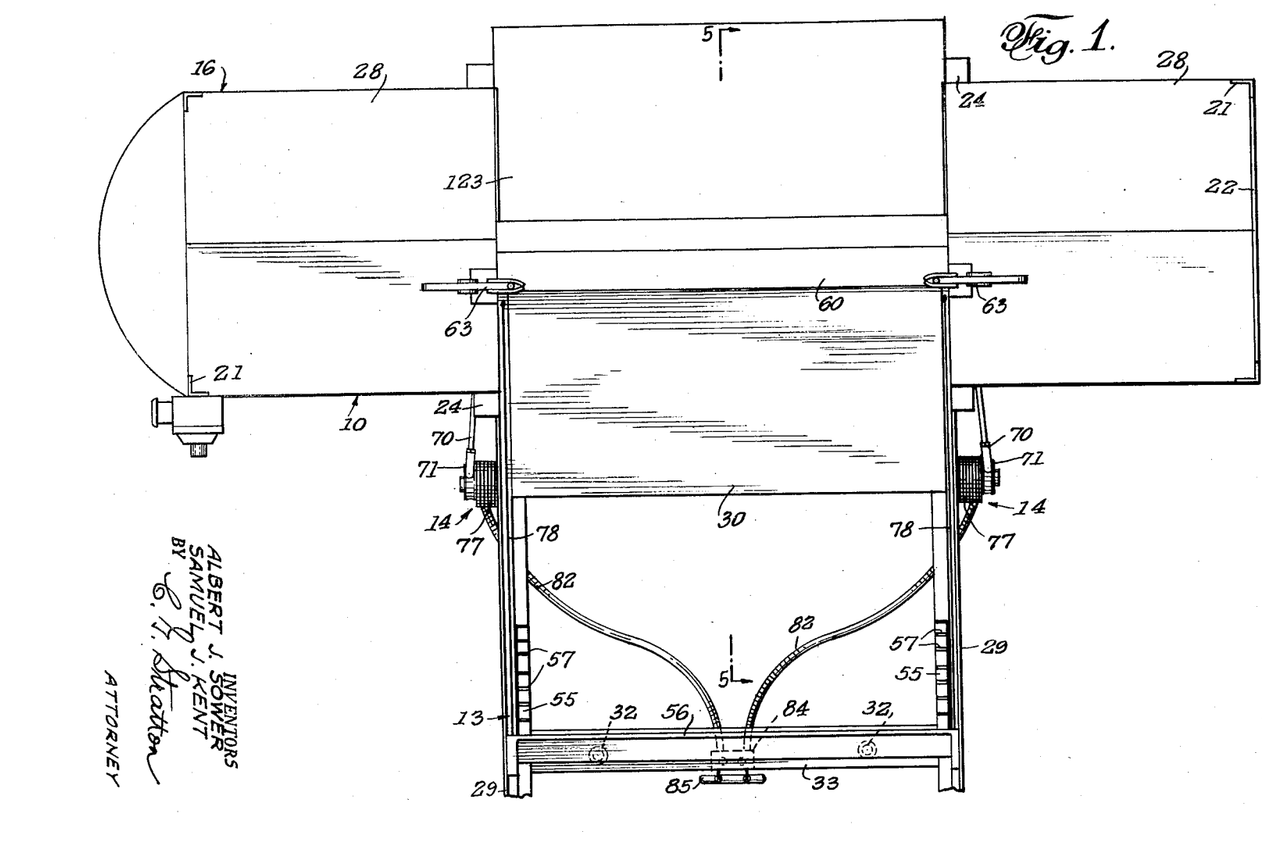
Fig. 1 is a plan view of a strip-cutting machine according to the present invention, the same being shown with covers and guards in place.

The leg portion of frame 10 is shown as comprising spaced members 29 that extend from a point adjacent the kerf 27 and at the mentioned downward slope a substantial distance large enough to accommodate a standard plywood or like panel. Thus, the members 29 may, in practice, be spaced to accommodate the four-foot width of a four-by-eight foot panel and be of a length to accommodate the eight foot length of such panel together with the means 13 for holding a stack of such panels.

Where the members 29 extend into the bar portion of the frame, the same are connected by a cross plate 30 which extends outwardly from said bar portion as can best be seen in Figs. 1 and 5. The frame part thus formed may be braced to the bar portion of the frame by braces 31 and may be supported from the floor by adjustable standards 32 that connect with a cross member 33 between intermediate portions of members 29.

The trackway or guide 11 is shown as comprising a pair of bars or tubes 34 that span between blocks 34a carried by end frame members 19 and 20. Said trackway is clear and unobstructed from end to end, the length thereof being substantially coincidental with the length of the bar portion of the T-frame.

The strip-cutting unit 12 comprises a base plate 35 which has a central opening 36 and is secured to a pair of axles 37 on the ends of which are provided grooved rollers or wheels 38. Said wheels are designed to rest upon bars 34 and to track therealong between the opposite ends of the frame 10.

Plate 35 forms the upper member of an open cage 39 that comprises a lower plate 40 and depending members 41 that connect the plates 35 and 40. Said cage does not turn but nevertheless has an axis on which a foot or thrust bearing 42 (Figs. 2 and 5) is disposed, the same being carried by lower plate 40.

Cage 39 supports an inner cage 43 (Fig. 4) on bearing 42, the latter thereby being rotational on the mentioned axis and movable along the trackway together with cage 39. Cage 43 is shown as an annular member 44 that is affixed by brackets 45 (Fig. 3) to a plate 46 that is disposed within the opening 36 of plate 35. A lower plate 47 is connected by depending members 48 to plate 46. Since plate 46 is centered in opening 36, cage 43 retains a central axial position with respect to outer cage 39 regardless of its rotational position. It is the inner cage that mounts the cutting means of the present machine.

Figure 3:
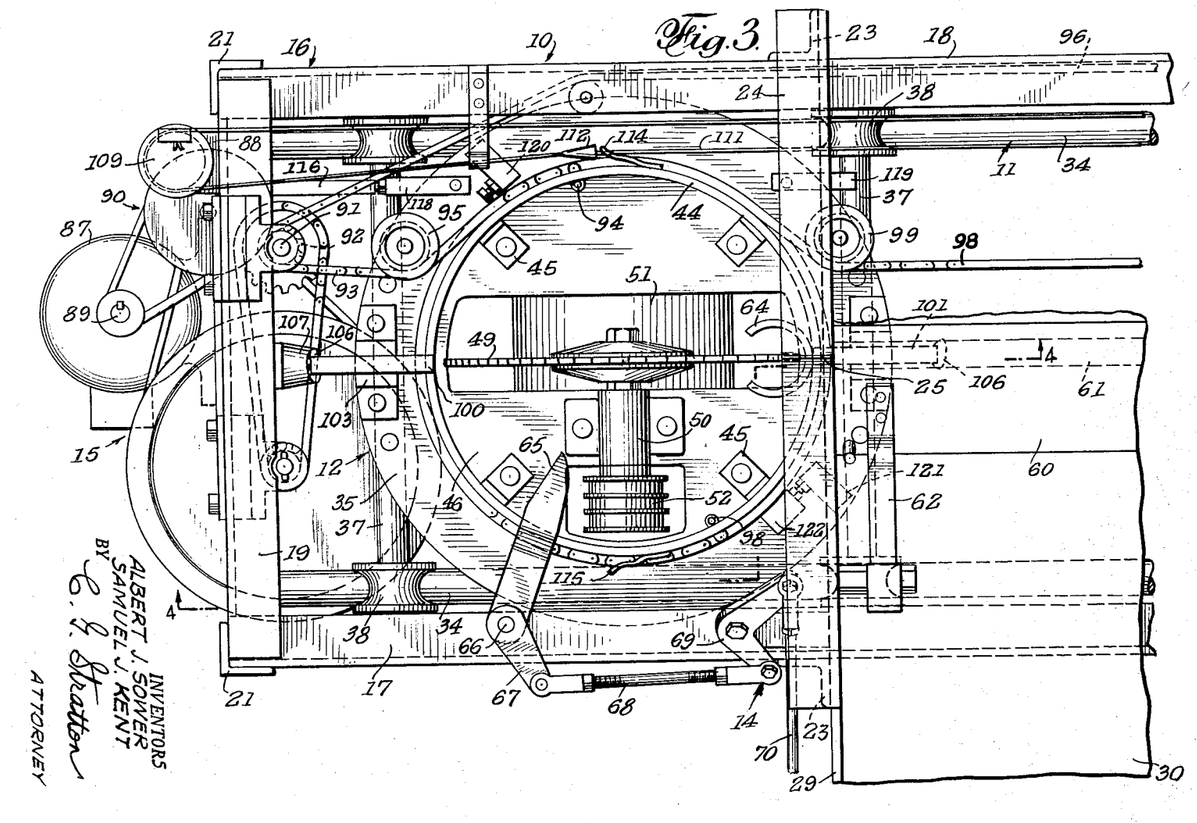
Fig. 3 is a further enlarged plan view of the end or portion of the machine shown in Fig. 2.

As best seen in Figs. 3, 4 and 5, the latter means comprises a circular saw 49, on an arbor that is mounted in a bearing 50 affixed to plate 46, and disposed in a vertical plane so as to pass through kerf 27 as the unit 12 is moved between the frame ends. Therefore, the axis of rotation of saw 49 is horizontal and, as can be seen from Fig. 3, the plane of the saw and its axis of rotation are on normally intersecting diameters of annular member 44.

The plate 47 of inner cage 43 mounts an electric motor 51, and a belt and pulley drive 52 interconnects said motor and the saw to drive the latter always in the same direction, as exemplified by arrow 53 (Fig. 4).

The means 13 is provided for holding a stack of panels 54 in position on the members 29 and plate 30 so that the forward edge of said stack spans the space between kerfs 27 and is in the path of saw 49 as the unit 12 traverses the machine between its ends.

Figure 7:
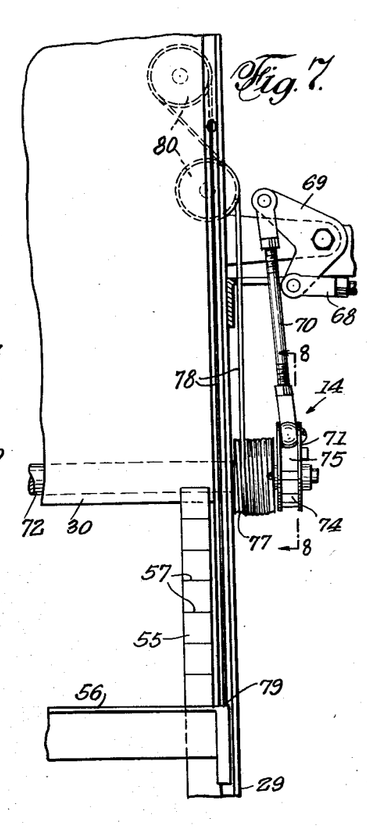
Fig. 7 is a fragmentary plan view of panel-advancing means employed in the present machine.

Said means 13 is shown as a pair of panel-edge engaging clamp members 55 that ride along frame members 29 and are connected by a cross member 56 (Figs. 1, 5, and 7). Members 55 may be formed to have a single abutment for all of the panels of stack 54. However, it is advantageous to stagger the panels, as shown in Fig. 5 so that the same are offset, relatively, a distance equal to the width of the strips formed by the machine. Such offset enables maintaining of clamping control of the stack even when the farthest advanced panel is substantially used up, since those panels that are above such panel of farthest advance are still of such width as to be properly clamped. Accordingly, each member 55 is provided with a set of stepped abutments 57 to locate the panels of the stack 54 in the mentioned offset relationship.

The means 13 includes a clamp bar 58 that is carried by a toggle clamp 59 affixed to cross member 56, said clamp bar being movable by clamp 59 into and out of clamping engagement with the uppermost panel of the stack 54. The clamping force is in the direction of clamp members 55, as can be seen from Fig. 5.

The means 13 further includes a clamp bar 60 that is provided with a kerf 61 to pass the saw 49 and is resiliently mounted, as on spring arms 62 carried by frame members 24. Said arms 62 are biased to urge bar 60 into clamping engagement with the stack adjacent to the edge thereof that is operated on by the saw. The pressure at this point being resilient, the stack is enabled to be slid along its support frame and fed to the next cut-off position.

Said bar 60 may be guided by clamp members 63 (Figs. 1 and 3) which may be used to regulate the clamping pressure, as desired. Bar 60 may be lifted out of engagement with the stack but, in any case, allows feed of the stack by the means 14.

The means 14 is controlled by the unit 12 when the latter is at either end of the trackway 11, the control being particularly effected by a member 64 (Figs. 2 to 5) carried by the annular member 44 upon 180 degrees rotation of said member. The operation of the means 14 is carried out after the unit 12 has reached the end of its travel in either direction, and before the same starts the next cutting stroke.

Said means 14 is shown as an arm 65 (Fig. 3) at each end of the machine, each carried on a pivot 66 and connected to an arm 67. As member 64 engages and rocks each arm 65, the connecting arm 67 actuates a link 68 which oscillates a bellcrank lever 69. Each respective lever 69, through a link 70 (Figs. 7 and 8), oscillates an arm 71 around the axis of a shaft 72. Said shaft is journalled in bearings 73 (Fig. 2) affixed to frame members 29, the shaft being disposed beneath the frame and the stack of panels carried thereby.

Each end of shaft 72 is provided with a ratchet wheel 74 (Fig. 8), and a pawl 75, carried by each arm 71, is engaged with the teeth of said wheel 74 to feed the same and partially rotate shaft 72 each time one of the arms 71 is moved, as above described. The recovery movement of arms 71 and the pawls 75 thereof may be effected by a spring 76 (Fig. 2) that connects the end of each said arm and the frame 10.

Shaft 72, between each arm 71 and the adjacent frame member 29, mounts a helically-grooved drum 77 around which is wound a wire or cable 78 (Fig. 7). The other end of each cable 78 is connected at 79 to the cross member 56 and the intermediate portion of each said cable is trained over pulleys 80 in a manner to advance said member 56 with each movement of arm 71 by the described arms, links and levers.

Any suitable provisions may be made to limit the advance of the stack 54 to insure that members 55 do not reach the path of saw 49. When such limit has been reached or, optionally, at an earlier time, the pawls 75 may be lifted out of engagement with the ratchet wheels 74, enabling manual retraction of cross member 56 and the stack-advancing clamp members 55 for placement in the machine of new stack. The latter is staggered, as before, and each panel of the stack forms an extension of the residual panels held clamped by member 61 while the machine is being replenished.

The means for releasing the pawls is here shown as a wire 81 (Fig. 8) connected to the tail of each pawl and extending through a flexible casing 82 extending between a block 83 on each arm 71 and a block 84 (Fig. 1) affixed to the middle of frame cross member 33. A pull handle 85 connects the ends of wires 81 that pass through block 84. It will be clear that a pull on said handle will free the ratchet wheels 74, as above indicated, and that release of said bundle will enable a spring 86 (Fig.

8) engaged with each pawl to return the same to operating position. Casing 82 is made of such length as to enable the arms 71 to be oscillated without restriction.

The means 15 to move the unit 12 from one end of the trackway 11 to the other and to rotate said unit at the end of each said movement so that the teeth of saw 49 are at all times moving in the cutting direction of arrow 53, is operated by an electric motor 87 (Figs. 2 to 4) which is of the reversing type and is reversed by a switch 88.

The output shaft 89 of motor 87, through suitable reduction gearing or pulleys 90, drives a relatively slow shaft 91 on which is provided a sprocket wheel 92. Around said wheel 92 is trained a chain 93 that has one end 94 connected to annular member 44 after being first trained over a pulley 95 mounted on plate 35.

Said chain 93 has a run 96 that extends from sprocket wheel 92 to and around a similar wheel 97 (Fig. 6) at the opposite end of the machine. The other end 98 of chain 93 is connected to said annular member 44 after having first been trained around a pulley 99 that is similar to pulley 95.

Since the member 44 constitutes an element that connects the ends 94 and 98 of chain 93 and makes said chain endless, it will be clear that when said member and the cage 43 carried thereunder are locked against rotation, the motor 87, through the described drive, will cause the unit 12 to traverse from one end of the machine to the other, according to the direction of drive to said motor.

The means to lock cage 43 against rotation relative to cage 39 is shown as a pair of similar dogs 100 and 101 carried on pivots 102 (Fig. 4) of brackets 103 affixed to plate 35 of unit 12. Springs 104 bias said dogs each in a direction to enter a notch 105 in the annular member 44 when said notch is aligned with one of said dogs. Each dog is provided with a bumper piece 106, one end of the machine being provided with a dog-lifting bumper 107 to lift dog 100 by engaging its bumper piece as shown in Fig. 4, and the opposite end of the machine having a bumper 108 (Fig. 6) to lift dog 101 by engaging its bumper piece. Thus, only at the ends of the traverse of the unit 12 is the inner cage 43 freed for rotation around the mentioned axis of cage 39.

The means 15 includes means to operate the reversing switch 88 to initiate traversal movement of unit 12. To this end, switch 88 is provided with an actuator in the form of a pulley 109 (Figs. 2 and 3), a comparable pulley 110 (Fig. 6) is provided at the opposite end of the machine, an endless cable 111 is trained over both said pulleys, an abutment 112 is provided on said cable adjacent one end of the machine, a similar abutment 113 is provided on said cable adjacent the other end of the machine, and the annular member 44 is provided with a pair of similar abutment-engaging bifurcations 114 and 115 which engage and move one or the other of the abutments 112 and 113 (according to the position of unit 12) to actuate reversing switch 88.

Overrun of the linear movement of unit 12 is obviated by adjustable stops 116 (Fig. 3) and 117 (Fig. 6) at opposite ends of the machine and which are engaged, respectively, by stop-engaging members 118 and 119 affixed to the plate 35 of unit 12. Overrun of the rotational movement of saw-carrying cage 43 is obviated by stops 120 and 121 carried at opposite sides of plate 35 and a stop-engaging lug 122 carried by the annular member 44 and operating between said stops 120 and 121.

Operation

After a stack of panels 54 has been placed in the machine in the manner shown in Fig. 5 and the motor 51 has been started in operation to rotate the saw at its cutting speed, the motor 87 is set into operation.

Starting from the position of unit 12, as shown in Figs. 3 and 4, wherein the dog 101 is in locking engagement with annular member 44 and the saw 49 is thereby locked in a plane parallel to the longitudinal extent of the trackway 11, the resultant rotation of sprocket wheel 92 will cause traversal of unit 12 toward the right. Therefore, the saw will cut off such portion of stack 54 that extends past the plane of movement of said saw. Such cut off pieces will fall onto sloping floor 123 and will ultimately be discharged from the machine. The first cut may be waste and is performed to ready the stack for subsequent operation.

Figure 6:
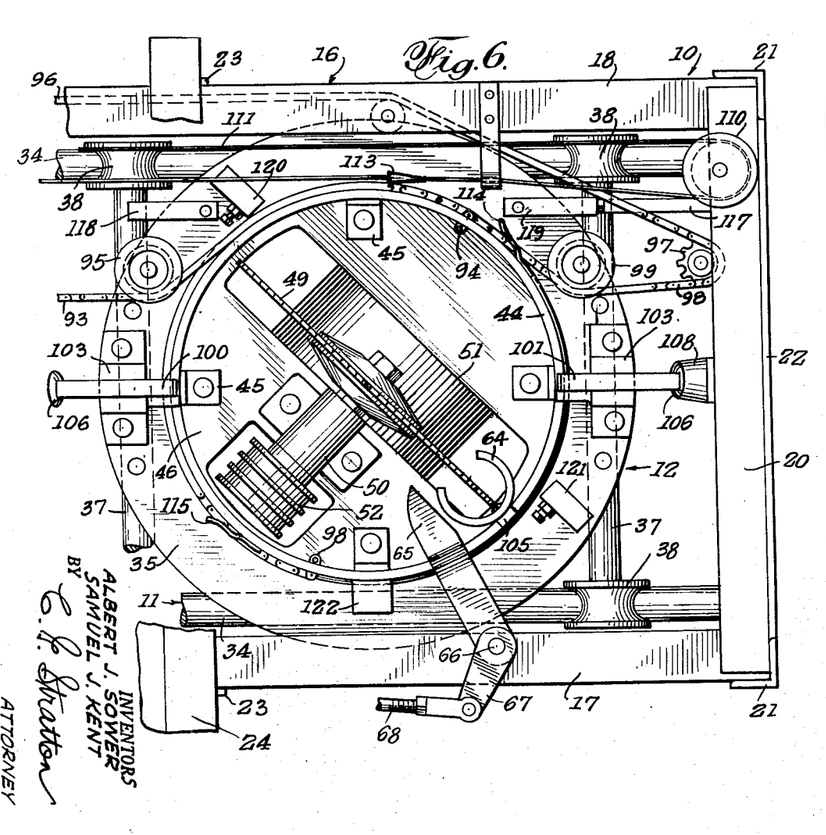
Fig. 6 is a plan view, comparable to Fig. 3 and showing the other end of the machine, the mechanism being shown in the process of being reversed for return to the opposite end.

When the unit 12 reaches the right end of the machine, the locking dog 101 will be lifted by pumper 108, thereby releasing the saw-carrying cage 43. Since the unit 12 has come to rest against stop 117 and chain 93 is still being driven, the released cage 43 will start to rotate in a clockwise direction, Fig. 6 showing said inner cage one-quarter way through such rotation. Because of the mutual tapered release engagement of abutment 113 and bifurcation 114, the latter will move past the former without actuating the cable 111. Hence, the reversing switch will retain its position. Also, during such clockwise rotation of the inner cage, the member 64 encounters arm 65, as seen in Fig. 6, and causes the means 14 to effect a stack-feeding movement of the means 13, thereby advancing the stack end 124 beyond the plane or path of movement of the saw 49. The ratchet wheel teeth render the feed uniform. The angle of arm 65 may be adjusted to retain the accuracy of the feed.

As the movement of chain 93 continues, the rotation of the saw-carrying cage is completed when notch 105 moves into register with dog 100 which, because it is spring-biased, falls into said notch to lock cage 43. Now, the teeth of saw 49 are directed for cutting through the stack upon a leftward traversal of the unit 12.

As the cage 43 achieves locked position, the bifurcation 115 encounters the blunt end of abutment 113 and pushes the same to cause actuation of cable 11 and movement of the reversing switch 88, causing reversing of motor 87. The unit 12 then begins its leftward traversal, cutting strips from the stack of a width according to the degree of feed of said stack. When unit 12 reaches stop 116, dog 100 will be tilted to release position, the saw-carrying cage will reverse its rotation to effect a proper presentation of the saw teeth for the next cut, and the stack will feed as before rightward traversal of the unit 12 began.

Thus, the present machine provides a cutting stroke with each traversal of the unit 12 and a feed of the stack 54 alternately with each such cutting stroke. Since the operation is entirely automatic, as described, the operation is rapid and efficient.

As above explained, before the stack has been cut up, the stack-holding means 13 is withdrawn so that a new set of panels may be interposed between the cross member 56 and stepped members 55, at one end, and the staggered ends of the resiliently held residual stack, at the other. Then, the cutting cycle may be again instituted.

Because the stack of panels is presented to the saw at the angle of members 29 and plate 30, the opposite edges of the strips will have a shallow bevel, the same being desired in carpet-anchoring strips. However, the present machine may be simply modified by providing for presenting the stack square or normal to the saw, thereby producing strips of rectangular cross-section. Further, the machine may be made so that the members 29 and plate 30 are adjustable, as by means such as standards 32, to any desired angle of presentation of the stack. Otherwise, the machine would function as above described.

Figure 9:
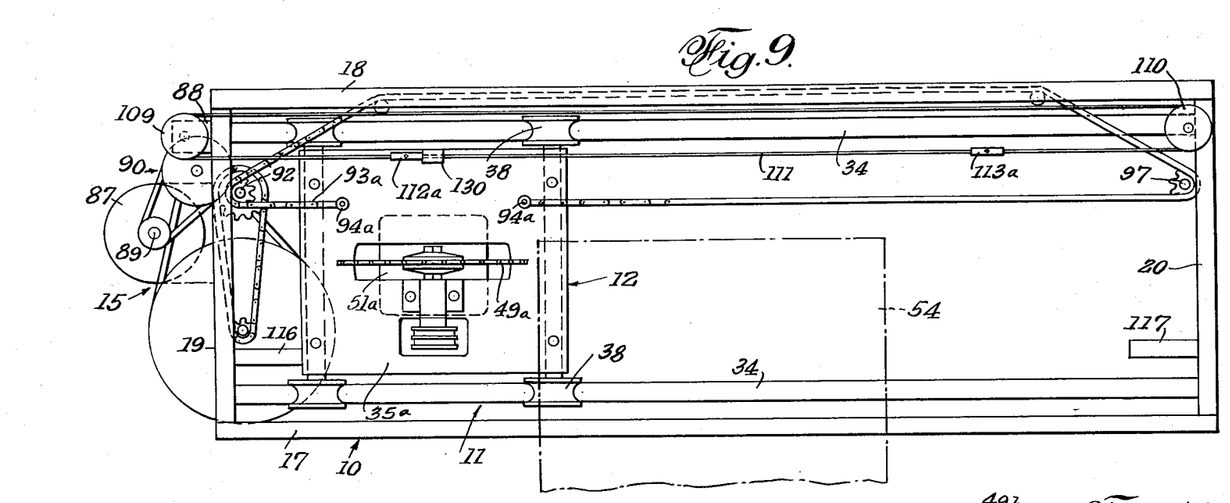
Fig. 9 (Sheet 7) is a plan view of a modification, the panel-holding and -feeding means being omitted since the means shown in the other views may be used.
Figure 10:
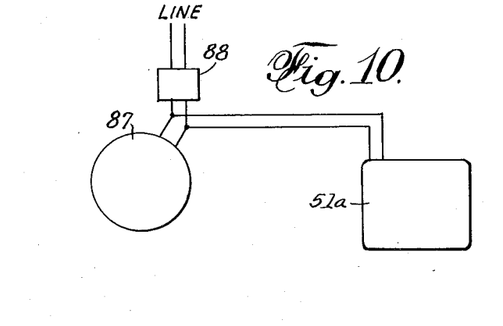
Fig. 10 is a diagrammatic view of the manner of connecting a reversing switch and cutter traverse and rotation motors of said machine shown in Fig. 9.
Figure 11:
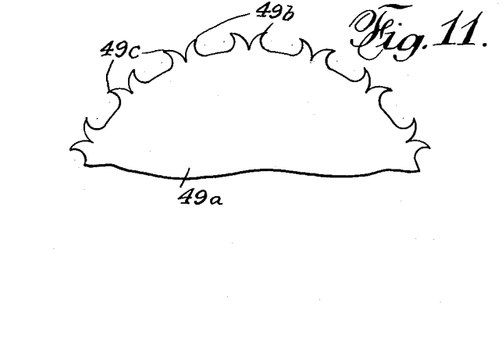
Fig. 11 is a side view showing a portion of the cutter used in the modified machine.

In the modification of Figs. 9, 10 and 11, the turret form of the unit 12 is changed to a non-rotational structure in which the cutter-driving motor 51a is a reversible type, as is the unit-traversing motor 87, and the circular cutter 49a has teeth 49b that cut when the cutter is rotated clockwise, as viewed in Fig. 11, and teeth 49c that cut when the same is rotated counter-clockwise. Accordingly, said motor is fixedly carried by plate 35a, or by a suitable depending structure affixed to said plate. The trackway or guide 11 mounts the unit 12 as described in connection with the earlier form of the invention.

It will be recalled that the reversing motor 87, under control of the reversing switch 88, causes back and forth traversal of unit 12 and also turning of the turret of said unit. In the modification, the chain drive 93a omits the mentioned turret-turning connection, the same having its ends 94a directly connected to plate 35a so that the saw blade or cutter 49a moves back and forth as motor 87 is reversed.

As shown in Fig. 10, the reversing switch 88 is connected in series with motor 87 and cutter-rotating motor 51a, said two motors being connected in multiple, as shown. Thus, each time motor 87 reverses, motor 51a also reverses. Therefore, the cutter 49a rotates in one direction when the unit 12 moves in one direction, and said cutter rotates in the opposite direction when unit 12 is traversed oppositely.

As before, the endless cable 111 causes actuation of reversing switch 88, the same being provided with abutments 112a and 113a that are alternately engaged by a lug 130 on the plate 35a.

In other respects, the machine and method set out with respect to Figs. 1 to 8 is embodied in the modification of Figs. 9, 10 and 11.

While the foregoing has illustrated and described what are now contemplated to be the best modes of carrying out our invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described our invention, what we claim and desire to secure by Letters Patent is:

1. In a strip-producing machine, a straight trackway; a strip-cutting unit mounted on the trackway and comprising an outer cage engaged with the trackway to move therealong in both directions, alternately, an inner cage carried by the outer cage and mounted for rotation on an axis normal to the extent of the trackway, and a toothed, rotary saw carried by the inner cage and disposed on an axis intersecting the axis of rotation of the inner cage and transverse to the extent of the trackway; means to releasably lock the cages to hold the saw in a plane parallel to the path of extent of the trackway and during movement therealong; and a chain drive to move the unit bodily along the trackway when the cages are locked together, and at the end of such bodily movement to move the inner cage through one-half of a revolution when the cages are unlocked to, thereby, reverse the saw.

2. A strip-producing machine comprising a toothed rotary disc saw, a rotational cage having an axis of rotation normal to the axis of rotation of the saw, an outer traversing cage mounting the rotational cage, means to move the outer cage with the rotational cage and the saw along the same path normal to both said axes of rotation alternately in opposite directions, the plane of the saw being disposed on said path at all times when said cages are traveling along said path, means to hold a stack of panels with one edge of the stack extending across said path, means non-rotationally locking the cages for traversal along the path in both directions, means at each end of the path to release said locking means, and means to rotate the rotational cage through 180° and thereby reverse the saw at each end of said path to, at all times, present the saw teeth in panel-cutting relationship.

3. A strip-producing machine comprising a toothed rotary saw, means to move said saw along the same path alternately in opposite directions, means to hold a stack of rectangular panels with one edge of the stack extending across said path of movement of the saw, means to reverse the saw at each end of its path to at all times present the saw teeth in panel-cutting relationship while the saw is traveling along said path, said means to reverse comprising a rotational cage mounting said saw, an outer traversing cage mounting the rotational cage, means non-rotationally locking the cages for traversal along the mentioned path, means at each end of the path to release said locking means, and a driven chain having its ends connected to said rotational cage to move the cages in strip-cutting traversal movement when the cages are locked together and to rotate the rotational cage through 180° to reverse the saw when the mentioned locking means is released.

4. A strip-producing machine according to claim 3 in which the chain is driven by a reversing drive, and means to reverse the drive at each end of the mentioned path.

5. A strip-producing machine according to claim 3 in which the chain is driven by a reversing drive, and means to reverse the drive at each end of the mentioned path, the mentioned locking means comprising two locking members one at each end of the path and each member being operable to release at its respective end of the traversal path.

References Cited in the file of this patent

UNITED STATES PATENTS

| | | |
|---|---|---|
| 174,503 | Elliott et al. | Mar. 7, 1876 |
| 335,516 | Flewwelling | Feb. 2, 1886 |
| 847,151 | Beck | Mar. 12, 1907 |
| 947,001 | Kertscher | Jan. 18, 1910 |
| 988,038 | Shipley | Mar. 28, 1911 |
| 1,062,814 | Bernhardt | May 27, 1913 |
| 1,348,389 | Barrett | Aug. 3, 1920 |
| 2,248,115 | Olsen | July 8, 1941 |
| 2,272,215 | Lockett et al. | Feb. 10, 1942 |
| 2,513,873 | Horton | July 4, 1950 |
| 2,540,004 | McFall | Jan. 30, 1951 |

FOREIGN PATENTS

| | | |
|---|---|---|
| 114,349 | Australia | Dec. 4, 1941 |